United States Patent
Cervantes (12) United States Patent (10) Patent No.: US 6,735,433 B1
(45) Date of Patent: May 11, 2004

(54) APPARATUS AND METHOD FOR AUTOMATED CALL FEATURE ACTIVATION/DEACTIVATION

(75) Inventor: Roberto Iparrea Cervantes, Coahuila (MX)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 455 days.

(21) Appl. No.: 09/685,184

(22) Filed: Oct. 11, 2000

(51) Int. Cl.[7] .................................................. H04M 3/42
(52) U.S. Cl. ...................... 455/417; 455/419; 455/420; 455/421
(58) Field of Search ................................ 455/417, 421, 455/419, 420

(56) References Cited

U.S. PATENT DOCUMENTS 5,243,645 A * 9/1993 Bissell et al.
5,635,897 A    6/1997 Kuo .................. 340/311.1
5,794,141 A * 8/1998 Zicker
6,091,948 A * 7/2000 Carr et al.
6,233,448 B1 * 5/2001 Alperovich et al.

FOREIGN PATENT DOCUMENTS

| DE | 195 05 486 | 8/1996 |
| DE | 297 04 607 | 5/1997 |
| FR | 2 740 247 | 4/1997 |
| JP | 08321859 | 12/1996 |

* cited by examiner

*Primary Examiner*—Sinh Tran
*Assistant Examiner*—Huy Nguyen (57) ABSTRACT

A system and method for automated activation of a call feature having a first (e.g., activated) state and a second (e.g., deactivated) state comprises a fixed device for transmitting an input signal to a portable device including a receiver for receiving the input signal, and a transmitter for transmitting an answerback signal to a receiver in the fixed device. The call feature is placed in the first state when the fixed device receiver fails to receive the answerback signal.

6 Claims, 7 Drawing Sheets

APPARATUS AND METHOD FOR AUTOMATED CALL FEATURE ACTIVATION/DEACTIVATION

TECHNICAL FIELD

This invention relates generally to service features available to telecommunications service subscribers. More particularly, the invention is related to the activation and deactivation of such features, such as call forwarding, voice mail, etc.

HISTORY OF RELATED ART

The use of telecommunications, along with cellular telephones, has grown tremendously in the past few years. Service providers continually search for new features to offer subscribers in conjunction with basic communication services. Such call features include call forwarding, voice mail, call waiting, selective call forwarding, auto redial on busy, and a multitude of others.

Society has also become increasingly mobile. Thus, subscribers to telecommunications services move between various locations, such as the office, home, and automobile, on a regular basis. Depending on the particular location, it may be more convenient to receive calls at a desktop telephone, on a cellular telephone, or at a business associate's phone in another office. To provide for this particular need, call forwarding services are available, and can be activated by entering a feature code into the telephone where the service is to be activated. Unfortunately, there is no fool-proof system for reminding a subscriber to activate/deactivate this type of service. One must rely on personal notes, paper reminders, or some other mechanism to forward calls from the office to the home, and vice-versa, for example. If the subscriber forgets to make the appropriate transfer, he may be subject to receiving all business calls at home, when he is actually located in the office. This can be inconvenient and costly. On the other hand, if the subscriber forgets to activate the service in the first place, business callers may miss communicating with a subscriber whenever he returns home.

Therefore, what is needed is a system and method for automated activation/deactivation of call features. Such a system should operate to automatically activate/deactivate call features selected by the subscriber. The ideal system and method would obviate the need for any type of personal reminder, operating to activate/deactivate call features in response to the current location of the subscriber. For example, such a system and method might automatically activate a voice mail service for callers dialing an office number whenever the subscriber leaves the office. The system and method would also automatically deactivate the voice mail feature when the subscriber re-entered the office.

SUMMARY OF THE INVENTION

The invention provides a mechanism for automatically activating and deactivating call features selected by a subscriber, depending on the proximity of the subscriber to a selected location. Thus, for example, an office worker may elect to have all calls to his telephone forwarded to a colleague whenever he leaves his office. The forwarding feature would be deactivated upon returning to his own office. In this manner, call forwarding is automatically active in a manner appropriate to the location of the subscriber.

The invention includes a system for automated activation/deactivation of a call feature which includes a fixed device and a portable device. The fixed device transmits an input signal and includes a receiver. The portable device, which follows the subscriber, includes a receiver for receiving the input signal, and a transmitter for sending an answerback signal to the receiver of the fixed device. The answerback signal is sent only in response to receiving the input signal at the portable device receiver. Assuming that the call feature has two steps, such as a first (e.g. activated) state and a second (e.g., deactivated) state, whenever the portable device comes within the limited range of the fixed device, the call feature can be placed in the second state, and whenever the fixed device receiver fails to receive the answerback signal, the call feature can be placed in the first state. For example, when the subscriber, wearing the portable device, enters his office, a voice mail feature can be placed in the second (e.g., deactivated) state, and when he leaves his office, the voice mail feature can be put in the first (e.g., activated) state. The system may also include a telephone dealer, which is used to place the call feature into the activated or deactivated state.

The invention may also be embodied by a system for automated activation/deactivation and selection of a plurality of call features, including a fixed device and a portable device. In this case, the portable device transmitter sends an answerback signal and a feature selection signal, such that a particular feature selected by the subscriber at the portable device is activated/deactivated whenever the portable device comes within the limited range of the fixed device (i.e., the feature selection signal is sent from the portable device to the fixed device in response to selection of one of the plurality of call features).

The invention also includes a portable device for automated activation/deactivation of a call feature, wherein the portable device communicates with a fixed device having a transmitter and receiver. The portable device includes a receiver to receive the input signal, and a transmitter for sending an answerback signal to the fixed device in response to receiving the input signal at the portable device receiver. The call feature is placed in the first state when the fixed device receiver fails to receive the answerback signal.

The invention also includes a fixed device for automated activation/deactivation of a call feature. The fixed device communicates with a portable device having a receiver and transmitter which sends an answerback signal to the fixed device. The fixed device includes a transmitter for sending an input signal to the portable device receiver, and a fixed device receiver to receive the answerback signal. The fixed device also includes a processing circuit to place the call feature in the first state when the fixed device receiver fails to receive the answerback signal.

Finally, the invention includes a method for automated activation/deactivation of a call feature comprising the steps of transmitting an input signal to a portable device receiver, receiving the input signal by the portable device receiver, transmitting an answerback signal in response to receiving the input signal, and receiving the answerback signal and placing the call feature in the second state. Otherwise, if the answerback signal is not received, the call feature is placed in the first state.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
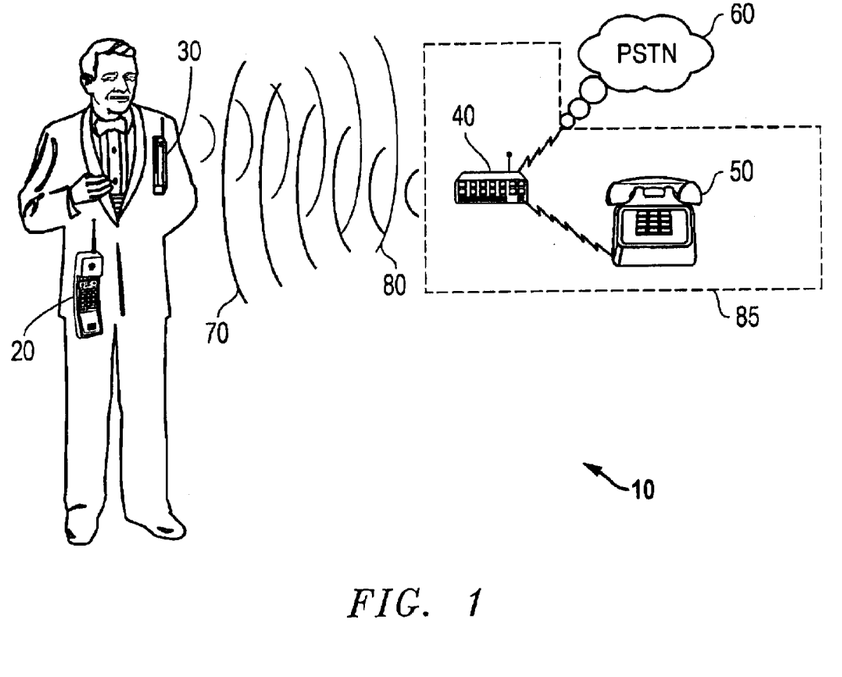
FIG. 1 illustrates several elements of the system of the present invention.

Turning now to FIG. 1, the system 10 for automated activation/deactivation of a call feature can be seen. By way of example, and not limitation, the system 10 is illustrated as it might operate with a portable phone 20 and a fixed phone 50. It should be noted that any combination of telecommunications devices, including portable cellular telephones 20, fixed desktop telephones 50, or other Customer Premises Equipment (CPE) can be used within the context of the system 10 and method of the present invention. As a system 10, the invention may include a portable device 30 and fixed device 40. The invention may also include the portable device 30 alone, or the fixed device 40 alone.

Operating as a system 10, the invention may interact with the Public Switched Telephone Network (PSTN) 60 directly, or via the telephone 50. The fixed device 40 periodically sends input signals 70 into the surrounding environment. The periodicity of the input signals transmission can be adjusted over a wide range, but will typically occur on the order of about once per second to about once per twenty seconds. The frequency of the input signals may also vary over a wide range, but will typically be chosen to occur within a frequency range of about 50 MHz to about 2.4 GHz. The strength of the input signal 70 can be adjusted to cover any conveniently-sized area, but will typically be set to cover an area of from about 5 m$^2$ to about 100 m$^2$ as received by the portable device 30.

The portable device 30 is tuned to receive the input signal 70, and discriminate the signal 70 from noise and other signals in the surrounding environment. Upon receipt of the input signal 70 at the portable device 30, an answerback signal 80 is transmitted from the portable device 30 to the fixed device 40. The portable device 30 operates by sending answerback signals 80 into the surrounding environment whenever input signals 70 are received. If no input signals 70 are received by the portable device 30, then the portable device 30 will stop sending answerback signals 80 into the environment.

The system 10 is typically programmed to operate by placing a selected call feature (having two states, such as a first state and a second state) used in conjunction with the fixed phone 50 into the second state when communication occurs (i.e., both signals 70, 80 propagate) or is reestablished, between the fixed device 40 and the portable device 30. However, when communication between the fixed device 40 and the portable device 30 is disrupted (i.e., the portable device 30 moves out of the limited range of the signal 70 emanating from the fixed device 40), the system 10 typically operates to place the selected call feature in the first state.

Thus, for example, if the selected call feature for activation/deactivation is "call forwarding", and the first state (e.g., activated state) of this feature forwards calls received at the fixed phone 50 to the portable phone 20, then the second state of the call forwarding feature is the deactivated state, which is implemented whenever the portable device 30 comes within continuous communication range of the fixed device 40. That is, as long as the portable device 30 receives input signal 70, and the fixed device 40 continues to receive corresponding answerback signals 80, the call forwarding feature will be deactivated (i.e., placed in the second state). However, when the portable device 30 fails to receive input signal 70, and thereby stops sending answerback signals 80, the fixed device 40 will typically operate to activate call forwarding (i.e., place the call feature in the first state) such that all calls received at the fixed phone 50 will be forwarded to the portable phone 20. Activation of the call forwarding feature will continue until communication is reestablished between the portable device 30 and the fixed device 40, as evidenced by receipt of the answerback signal 80 at the fixed device 40.

It should be noted that every call feature which can be addressed by the instant invention has two arbitrary states, for example, activated and deactivated, on and off, first and second, etc. Hereinafter the two states will be designated by "first" state and "second" state. Neither state is an absolute. However, if the "first" state is associated with activating a call feature, then the "second" state should be associated with deactivating the feature. Similarly, if the "second" state is associated with activating the feature, then the "first" state should be associated with deactivating the feature.

Figure 2:
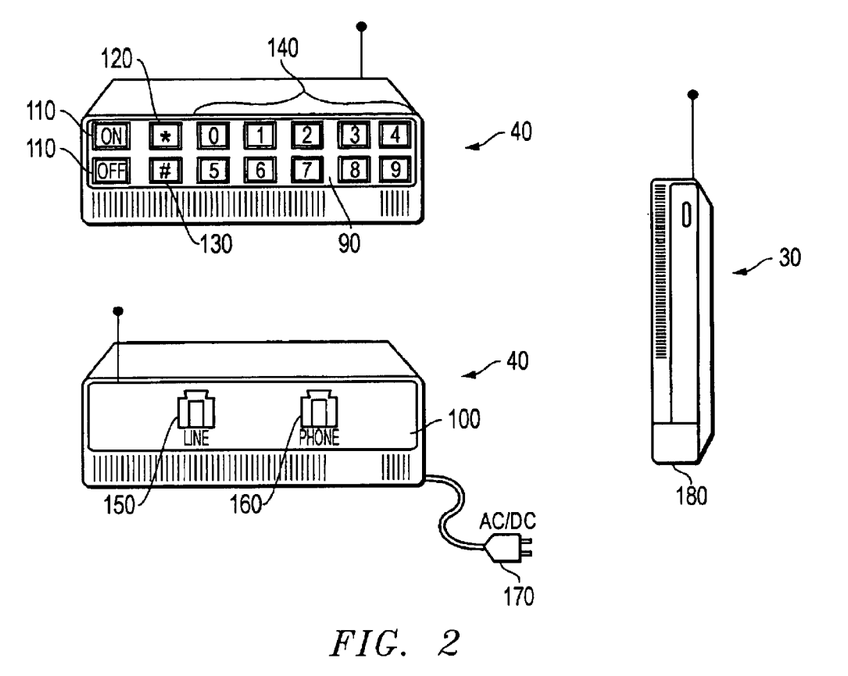
FIG. 2 illustrates the fixed device and portable device of the present invention.

Turning now to FIG. 2, one of many possible physical realizations of the fixed device 40 and the portable device 30 can be seen. Here, the fixed device 40 includes a front panel 90 upon which are disposed feature activation/deactivation (e.g. ON/OFF) switches 110, and switches which correspond to the keypad of a typical telephone, such as the "*" symbol 120, the "#" symbol 130, and numeric keys 140. The front panel switches 120, 130, and 140 allow entry of various feature codes and setting programmed operations for the fixed device 40 by a subscriber. Thus, a selected feature code can be set for activation/deactivation (e.g., ON/OFF) and stored in the fixed device 40 by the subscriber using the switches 110, 120, 130 and 140.

The fixed device 40 is typically operated by using the ON power switch 110 to program the fixed device 40 for placing the selected feature in its first state (when the portable device 30 moves out of range of the fixed device 40), such that the selected keypad DTMF tones for feature activation (e.g., "*60") may be stored in the fixed device 40 memory. Similarly, the OFF switch 110 can be used to store a different series of touch-tones entered on the front panel 90 (e.g. "#70") for storage in the fixed device 40 memory to place the feature code in the second state (when the portable device 30 comes back into the range of the fixed device 40).

The portable device 30 essentially mimics the operation of a radio-frequency repeater. That is, reception of appropriate radio frequency input signals triggers the transmission of corresponding radio frequency answerback signals. If no signals are received, then none are transmitted.

The fixed device 40 typically includes a phone line connector 150 and a telephone (CPE) connector 160 on the back panel 100. Power is usually supplied by a fixed power source 170, such as an alternating current outlet 170. The portable device 30 10 is typically powered by a portable power source 180, such as a battery.

Figure 3A:
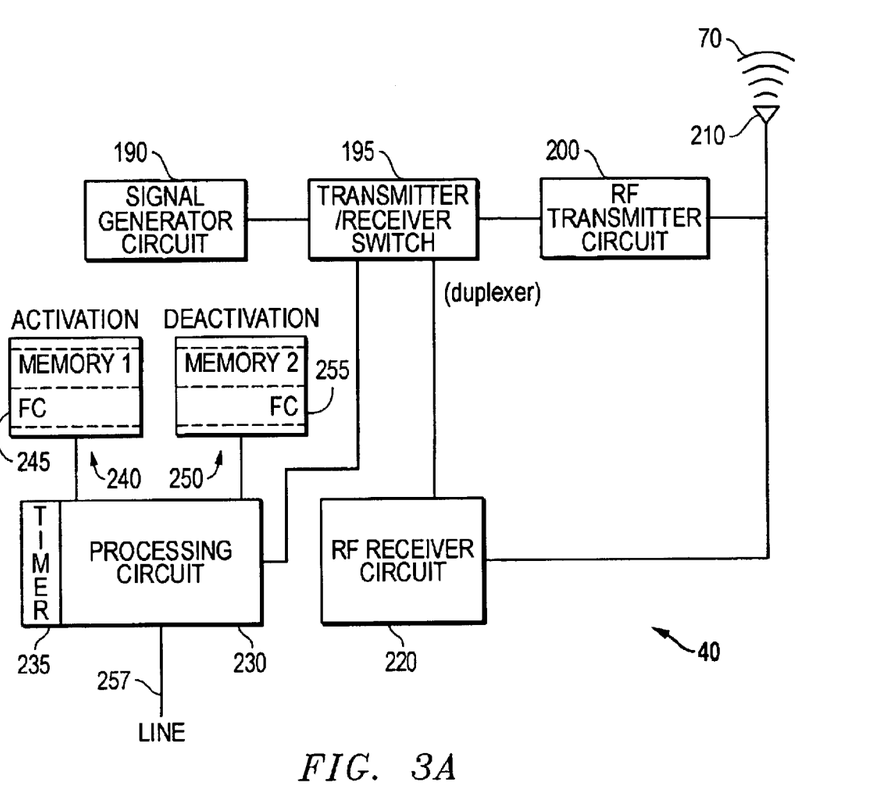
FIGS. 3A and 3B are block diagrams illustrating exemplary internal circuitry of the fixed device and portable device of the present invention.
Figure 3B:
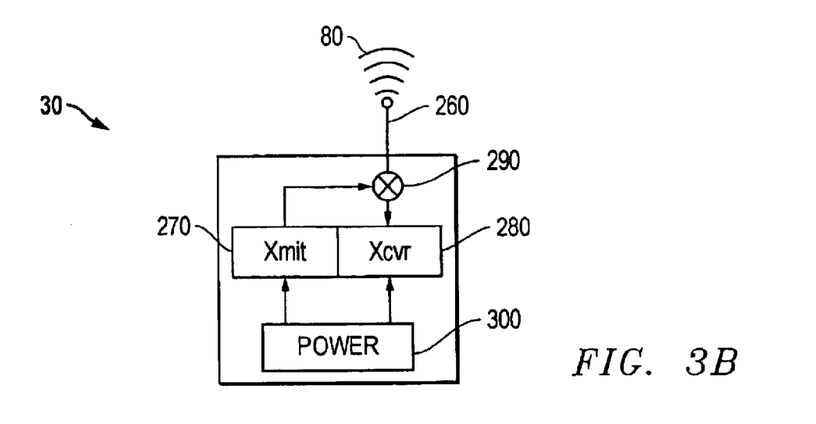

FIGS. 3A and 3B illustrate exemplary schematic block diagrams of the fixed device 40 and portable device 30, respectively. In FIG. 3A, one embodiment of the invention as a fixed device 40 includes an antenna 210, an RF transmitter circuit 200, an RF receiver circuit 220, a transmitter/receiver switch 195, a signal generator 190, an activation memory 240 (in which an activation feature code 245 may be stored), a deactivation memory 250 (in which a deactivation feature code 255 may be stored), and a processor 230.

The signal generator 190 and the transmitter 200 operate through the transmitter/receiver switch 195 (e.g. a duplexer) to create radio frequency location signals 20 (i.e., input signals 70) for transmission through the antenna 210.

Answerback signals 80, if received at the antenna 210, are directed to the receiver 220 through the transmitter/receiver switch 195, and then to the processor 230. At this point, the answerback signals 80 have been converted to pulses by the receiver 220, which are analyzed by the processor 230 (which may be a microprocessor, digital signal processor, or similar devices, as are well known to those skilled in the art) to determine whether the signals received are indeed answerback signals 80, or merely noise. A timer 235, which may exist as an integral part of the processor 230, or separately from the processor 230, can be used to determine the periodicity of input signal 70 transmission, and the amount of time since the last answerback signal 80 was received. Thus, if the answerback 80 signals are received within the selected time out period of the timer 235, then the selected activation/deactivation feature code will continue to be asserted at appropriate times over the telephone line 257 by the dialer 237. Otherwise, if answerback signals 80 have not been received for some selected time period as determined by the timer 235, then the corresponding activation/deactivation (opposite state) feature code 245 will be asserted over the telephone line 257 by the dialer 237.

FIG. 3B illustrates one of several possible schematic block diagrams of the portable device 30. Typically, the invention for automated activation of a call feature as embodied by a portable device 30 communicates with some type of fixed device 40 which is capable of transmitting input signals 70. The portable device 30 includes a receiver 280 for receiving the input signals 70, and a transmitter 270 for transmitting answerback signals 80 in response to receiving input signals 70. A power source 300, typically in the form of a battery, is used to power the transmitter 270 and receiver 280. A switch 290, is typically used to switch signals between the transmitter 270 and receiver 280, depending on whether the portable device 30 is sending answerback signals 80, or receiving input signals 70, via the antenna 260. The portable device 30 may have all of the component parts 260–300 integrated into a very small form factor, such as a "smart card" the size of a credit card, which can be easily carried in a subscriber's pocket, or attached to a portable cellular telephone 20 carried by the subscriber.

Figure 4:
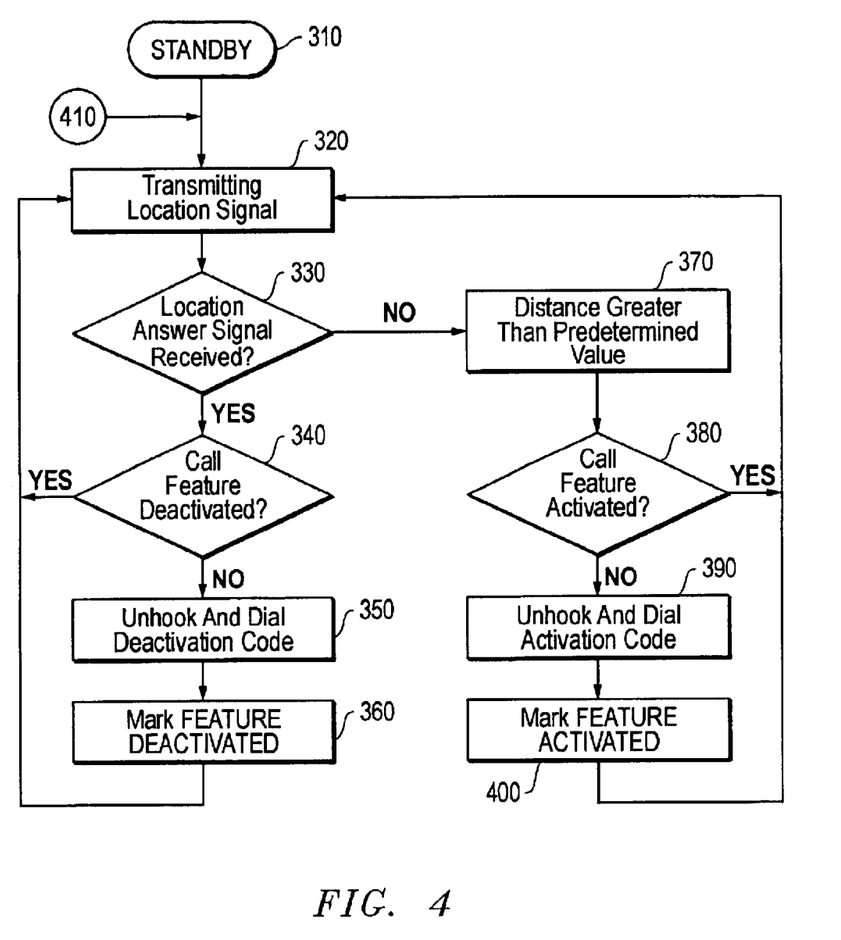
FIGS. 4 and 5 are flow charts illustrating the method of the present invention.
Figure 5:
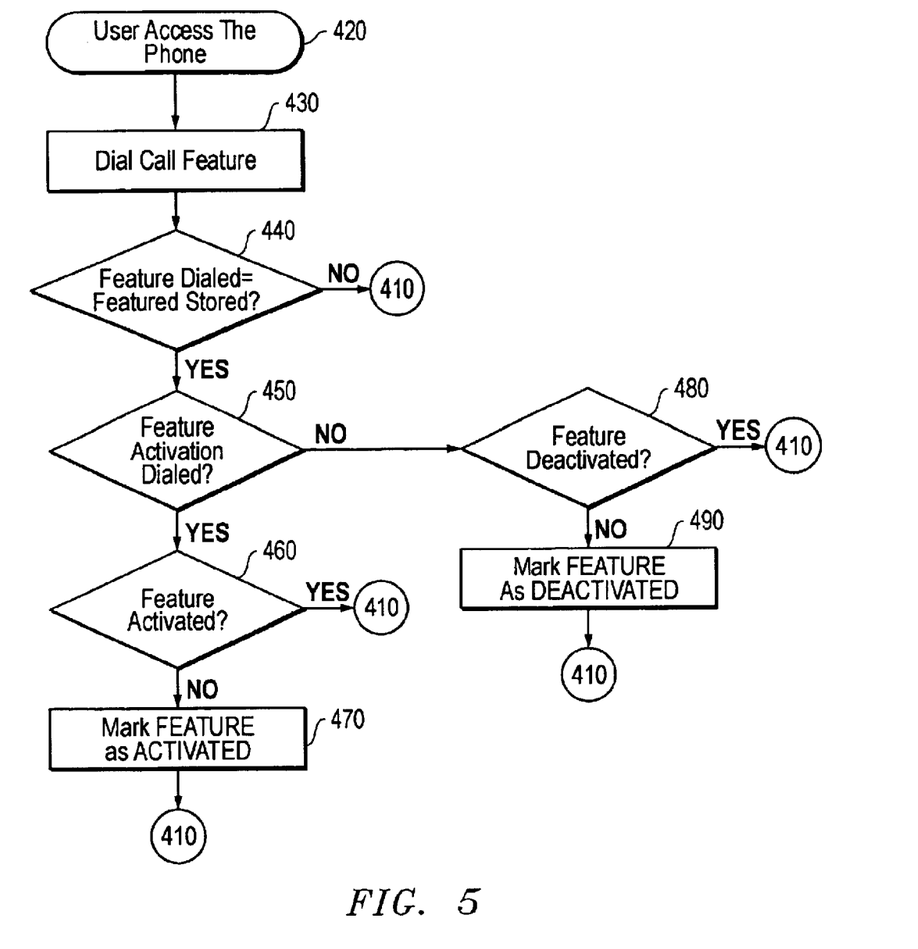

Turning now to FIGS. 4 and 5, a flow chart diagram of the method of the present invention can be seen. The method begins at standby step 310, and continues on to transmitting the location signal, or input signal 70, at step 320. If the answerback signal 80 is received at step 330, then the method continues by verifying that the call feature has been placed in the second state in step 340. If the feature is in the second state, then the method continues with transmitting the input signal 70 at step 320. If the feature has not been placed in the second state, then the method continues with step 350, where the line to the fixed phone 50 is opened and the second state feature code 255 is "dialed" and placed on the telephone line 257 for transmission to the PSTN 60. At this point, the feature is marked as placed in the second state within the fixed device 40 in step 360, and the method continues with periodic transmission of the input signal 70 in step 320.

If the answerback signal 80 is not received in step 330, then the method continues with step 370. The system 10, or fixed device 40 within the system 10, determines that the portable device 30 must be located at a distance greater than the predetermined value for the limited transmission/reception range selected by the subscriber, or programmed into the fixed device 40.

In step 380 the fixed device 40 determines whether the call feature has been placed in the first state. If not, then the method continues with step 390, wherein the fixed device 40 operates to open the line to the fixed phone 50 and "dials" the first state feature code 245 for transmission to the PSTN 60 on the telephone line 257. The method continues with step 400, wherein the feature is marked as placed in the first state, and the method continues with transmission of the input signal 70 at step 320. If the fixed device 40 determines that the call feature has already been placed in the first state in step 380, then the method continues with transmission of the input signal 70 at step 320. As mentioned above, the "first" state may correspond to activating or deactivating the call feature, as may the "second" state. The important distinction is that if one state corresponds to "activation", the other should correspond to "deactivation".

FIG. 5 illustrates subscriber access to the fixed phone 50, for independent activation/deactivation of the selected call feature. In step 420, the subscriber accesses the fixed phone 50, and enters the selected feature code at step 430 using the dialer 51. If the feature code selected by the subscriber in step 430 is not the same as the feature code previously stored in the fixed device 40, as determined in step 440, then the feature code will not be changed, and the method continues with step 410 in FIG. 4. Comparison of the feature codes selected by the subscriber (i.e., dialed) and the feature code stored in the fixed device 40 is made by monitoring the telephone line 257 using the processor 230 located within the fixed device 40. However, if the feature dialed (i.e., selected by the subscriber) is the same as that stored in the fixed device 40, then the method continues with step 450, wherein a determination is made as to whether the subscriber has selected the feature to be placed in the first state. This occurs in step 450. If so, then the fixed device 40 determines whether the feature is in fact in the first state in Step 460. If so, then the method continues with step 410 in FIG. 4, otherwise, the method continues with step 470, wherein the feature is marked as in the first state, and the method continues with step 410 of FIG. 4.

If the subscriber has not selected the feature to be in the first state, then the method continues with step 480, wherein the fixed device 40 determines whether the subscriber has selected the feature to be in the second state. If so, then the method continues with step 410 in FIG. 4. If not, then the fixed device 40 operates to mark the feature as in the second state in step 490 and the method continues with step 410 in FIG. 4.

Figure 6:
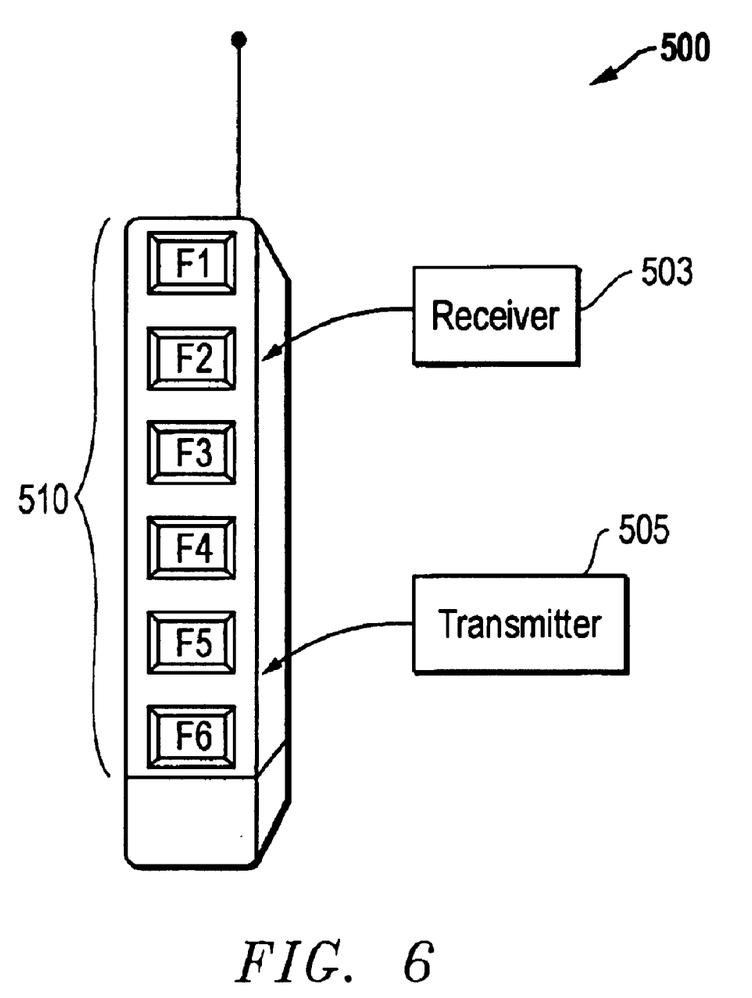
FIG. 6 illustrates an alternative embodiment of the portable device of the present invention.

An alternative embodiment of the invention is illustrated in FIG. 6, as embodied in a portable device 500 which includes a receiver 503 and a transmitter 505, along with a plurality of call features selectable using a corresponding plurality of feature keys 510. Thus, in response to operating one of the feature keys F1 . . . F6, a selected call feature can be activated/deactivated by the fixed device 40. In this case, the signal sent by the portable device 500 may be an answerback signal or a feature selection signal indicating the selected call feature which is to be activated/deactivated. The processor 230 will determine not only that the answerback signal 80 has been received, but also the identity of the selected feature code indicated by the feature selection signal which is to be recalled from the activation/deactivation memories 240, 250 for placement on the telephone line 257 by the dialer 237. In this case, a plurality of activation feature codes 245 can be stored in the activation memory 240, and a corresponding plurality of deactivation feature codes 255 can be stored in the deactivation memory 250. The precise memory location used to recall the feature code activation/deactivation values is selected, ultimately, by the operation of the features keys 510 on the portable device 500.

Figure 7:
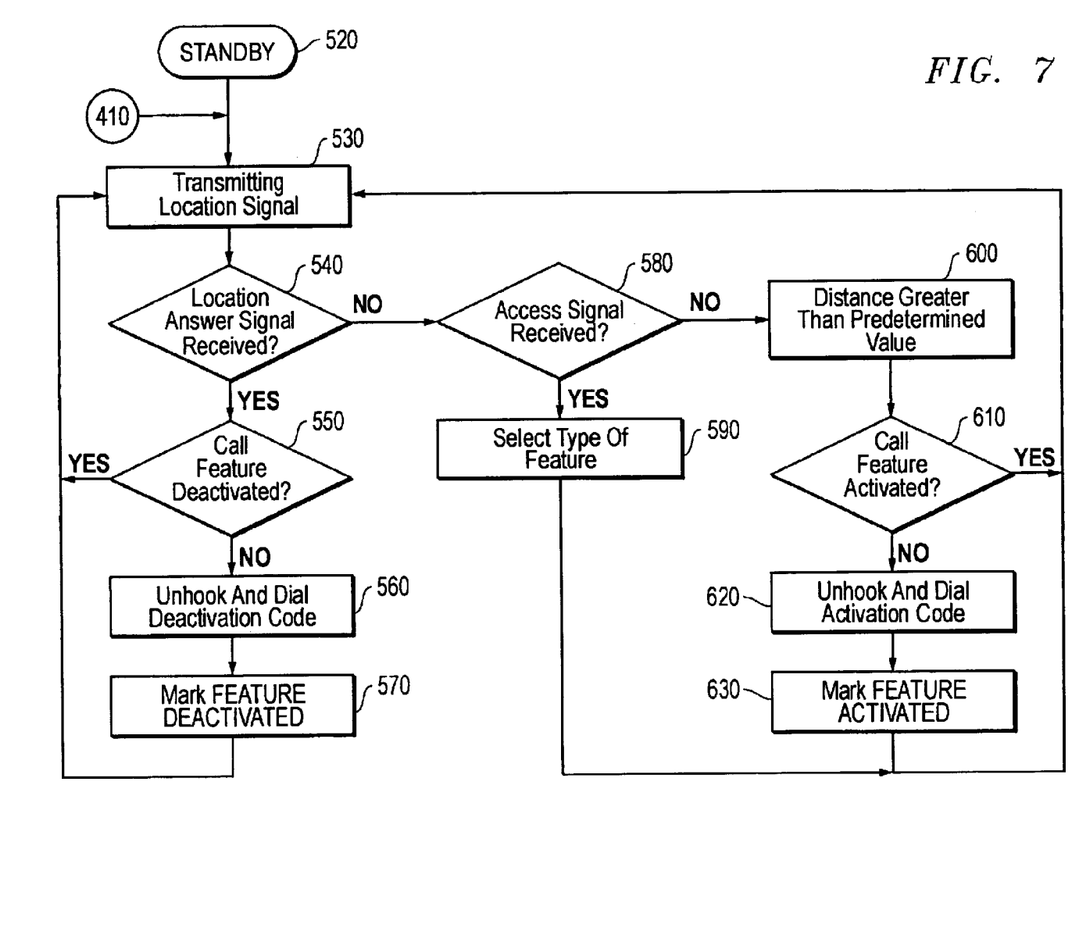
FIG. 7 illustrates an alternative embodiment of the method of the present invention.

The variation in the method of the invention induced by accommodating a plurality of selectable call features for activation/deactivation is illustrated by the flow chart shown in FIG. 7. In this case, the method begins at step 520 in a standby state and continues to step 530, wherein input signals 70 are sent from the fixed device 40 to the portable device 500. In step 540, the fixed device 40 determines whether an answerback signal 80, has been received. If so, then the fixed device 40 will determine whether the currently selected call feature has been placed in the second state in step 550. If so, then the method continues with periodic transmission of input signals 70 in step 530. If not, then the fixed phone 50 line 257 is opened by the fixed device 40, and the appropriate second state code, selected using a combination of the desired feature selection and corresponding second state feature code 255 is placed on the telephone line 257 using the dialer 237. At this point, the selected feature is marked in the second state in step 570, and the method continues with periodic transmission of the input signals 70 at step 530.

If no answerback signal 80 is received in step 540, the fixed device 40 operates to determine whether a feature selection signal has been received in step 580. If so, the method continues with step 590 wherein the activation and deactivation feature codes 245, 255 corresponding to the received feature selection signal are selected from the memories 240, 250 for use in future activation/deactivation cycles (e.g. steps 560, 620). The previously selected call feature is then placed into the second state in step 595 (in case the new feature selection signal is transmitted prior to the first answerback signal sent when the portable device 50 comes into range of the fixed device 40), and the method continues with receiving answerback signals in step 540. If no feature selection signal is received, as determined in step 580, then the method continues with step 600 (by assuming that the distance between the portable device 500 and the fixed device 40 is greater than the predetermined limited range value selected by the subscriber). Again, a determination of whether the newly selected call feature is in the first feature state is made in step 610. If so, then the method continues with periodic transmission of the input signal 70 from the portable device 500 in step 530. If not, then the fixed device 40 operates to open the phone line 257 and dials the selected feature first feature state code in step 620. The feature is then marked as the first feature state in step 630.

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A device for automated activation of a call feature having a first state and second state, the device comprising:
    a transmitter for transmitting an input signal within a limited area to a portable device;
    a receiver for receiving an answerback signal from the portable device; and
    a telephone dialer for placing a call into a network for changing the state of the call feature,
    a processing circuit in communication with the transmitter and the receiver, the processing circuit having instructions for:
        determining whether the portable device is within a local proximity to the device, if yes, then:
            determining an actual state of the call feature,
            determining a predetermined state for the call feature when the portable device is within the local proximity to the device,
            comparing the predetermined state to the actual state for the call feature to determine whether the states are the same, if not, then placing a call to change the state of the call feature;
        if the portable device is not within the local proximity to the device, then:
            determining the actual state of the call feature,
            determining a predetermined state for the call feature when the portable device is not within the local proximity to the device,
            comparing the predetermined state to the actual state for the call feature to determine whether the states are the same, if not, then placing a call to change the state of the call feature;
        wherein the call feature is call forwarding, voice mail, call waiting, selective call forwarding, or auto redail on busy.

2. A method for automated activation of a call feature having a first state and a second state, comprising the steps of:
    determining whether a portable device is within a local proximity to a device, if yes, then:
        determining an actual state of the call feature,
        determining a predetermined state for the call feature when the portable hi device is within the local proximity to the device,
        comparing the predetermined state to the actual state for the call feature to determine whether the states are the same, if not, then placing a call to change the state of the call feature;
    if the portable device is not within the local proximity to the device, then:
        determining the actual state of the call feature,
        determining a predetermined state for the call feature when the portable device is not within the local proximity to the device,
        comparing the predetermined state to the actual state for the call feature to determine whether the states are the same, if not, then placing a call to change the state of the call feature;
    wherein the call feature is call forwarding, voice mail, call waiting, selective call forwarding, or auto redail on busy.

3. The method of claim 2 wherein the determining whether the portable device is within the local proximity comprises:
    sending, at a periodic interval, at least one radio signal input messages within a limited coverage area; and
    determining whether at least one radio answerback message has been received from the portable device.

4. The method of claim 2 wherein the determining the actual state comprises accessing an indication of the last recorded state for the call feature from a memory device.

5. The method of claim 2 wherein the determining the predetermined state comprises accessing a database containing an indication of the predetermined state for the call feature when the portable device is within the local proximity to the device.

6. The method of claim 2 wherein the determining the predetermined state comprises accessing a database containing an indication of the predetermined state for the call feature when the portable device is not within the local proximity to the device.

* * * * *